(12) United States Patent
Swart et al.

(10) Patent No.: US 8,285,701 B2
(45) Date of Patent: Oct. 9, 2012

(54) VIDEO AND DIGITAL MULTIMEDIA AGGREGATOR REMOTE CONTENT CRAWLER

(75) Inventors: William D. Swart, Fairfax, VA (US); Michael L. Asmussen, Oak Hill, VA (US); John S. McCoskey, Castle Rock, CO (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 2242 days.

(21) Appl. No.: 09/920,615

(22) Filed: Aug. 3, 2001

(65) Prior Publication Data

US 2003/0028896 A1 Feb. 6, 2003

(51) Int. Cl.
  *G06F 7/00* (2006.01)
  *G06F 17/30* (2006.01)
(52) U.S. Cl. ........................................... 707/709
(58) Field of Classification Search .............. 707/709, 707/999.002
See application file for complete search history.

(56) References Cited

U.S. PATENT DOCUMENTS

| | | | |
|---|---|---|---|
| 4,677,685 A | 6/1987 | Kurisu | 725/151 |
| 4,860,379 A | 8/1989 | Schoeneberger et al. | 455/5 |
| 5,253,275 A | 10/1993 | Yurt et al. | 375/122 |
| 5,317,391 A | 5/1994 | Banker et al. | 725/139 |
| 5,600,573 A | 2/1997 | Hendricks et al. | 725/109 |
| 5,798,785 A | 8/1998 | Hendricks et al. | 348/1 |
| 5,818,511 A | 10/1998 | Farry et al. | 725/116 |
| 5,917,537 A | 6/1999 | Lightfoot et al. | 725/4 |
| 5,983,176 A * | 11/1999 | Hoffert et al. | 704/233 |
| 5,986,690 A | 11/1999 | Hendricks | 348/7 |
| 6,119,154 A | 9/2000 | Weaver et al. | 709/219 |
| 6,201,536 B1 | 3/2001 | Hendricks et al. | 345/716 |
| 6,286,006 B1 * | 9/2001 | Bharat et al. | 1/1 |
| 6,331,877 B1 | 12/2001 | Bennington et al. | 348/731 |
| 6,547,829 B1 * | 4/2003 | Meyerzon et al. | 715/501.1 |
| 6,751,612 B1 * | 6/2004 | Schuetze et al. | 707/4 |
| 2001/0037498 A1 * | 11/2001 | Johansson | 725/32 |
| 2002/0010682 A1 * | 1/2002 | Johnson | 705/59 |
| 2002/0032740 A1 * | 3/2002 | Stern et al. | 709/206 |

(Continued)

FOREIGN PATENT DOCUMENTS

EP 0961490 A 12/1999

(Continued)

OTHER PUBLICATIONS

Chadwick, Henry, et al., "DAVIC—Digital Audio-Visual Council", TV Anytime and TV anywhere, Dec. 1999, p. p. 1-140.
Henry Chadwick et al., "Digital Audio-Visual Council", TV Anytime and TV Anywhere, Dec. 1999, pp. 1-140.
Sergey Brin et al., "The Anatomy Of A Large-Scale Hypertextual Web Search Engine", Aug. 3, 2001, pp. 1-19.

(Continued)

*Primary Examiner* — Alexey Shmatov
(74) *Attorney, Agent, or Firm* — Banner & Witcoff, Ltd.

(57) ABSTRACT

A remote content crawler continually crawls a digital communication network looking for content to provide to a content aggregator. The content provided to the aggregator may be stored in a form of an entire content file. The content may include an entire movie, television program or electronic book. Alternatively, the content provided to the aggregator may be a reference to a content file that is stored at, or that will be available at one of the remote locations. The content may be a reference to a future, scheduled live sports event that will be made available to system users. The sports event may be provided for a one time fee, as part of a sports package, for which a fee is collected, or as a free event.

21 Claims, 13 Drawing Sheets

U.S. PATENT DOCUMENTS

2002/0099697 A1* 7/2002 Jensen-Grey ............... 707/3
2003/0033299 A1* 2/2003 Sundaresan ............... 707/5

FOREIGN PATENT DOCUMENTS

| EP | 0992922 A | 4/2000 |
| GB | 2343095 A | 4/2000 |
| WO | 0079794 | 12/2000 |

OTHER PUBLICATIONS

European Office Action for Application No. 02778472.7 mailed Feb. 15, 2010, 4 pages.

Office Action in Canadian Patent Application No. 2462161, dated Feb. 1, 2011.

* cited by examiner

VIDEO AND DIGITAL MULTIMEDIA AGGREGATOR REMOTE CONTENT CRAWLER

RELATED APPLICATIONS

The following U.S. Patents are hereby incorporated by reference:

U.S. Pat. No. 5,798,785, entitled "Terminal for Suggesting Programs Offered on a Television Program Delivery System;"

U.S. Pat. No. 5,986,690, entitled "Electronic Book Selection and Delivery System;"

The following co-pending U.S. patent applications also are incorporated by reference:

- patent application Ser. No. 07/991,074, filed Dec. 9, 1992, entitled "Remote Control for Menu Driven Subscriber Access to Television Programming;"
- patent application Ser. No. 08/906,469, filed Aug. 5, 1997, entitled "Reprogramable Terminal for Suggesting Programs Offered on a Television Program Delivery System;"
- patent application Ser. No. 09/191,520, filed Nov. 13, 1998, entitled "Digital Broadcast Program Ordering;"
- patent application Ser. No. 09/289,957, filed Apr. 13, 1999, entitled "Electronic Book Alternative Delivery Systems;"
- patent application Ser. No. 09/289,956, filed Apr. 13, 1999, entitled "Electronic Book Alternative Delivery Methods;" and
- patent application entitled "Video and Digital Multimedia Aggregator;" and patent application entitled "Video and Digital Multimedia Aggregator Content Suggestion Engine," both filed on date herein.

TECHNICAL FIELD

The technical field is television program and digital multimedia delivery systems that incorporate intelligent and flexible program search and delivery mechanisms.

BACKGROUND

Cable television delivery systems greatly expanded the array of programs available to television viewers over that provided by over-the-air broadcast systems. Subsequently, satellite television delivery systems, and in particular, digital satellite broadcast systems further expanded the viewing choices for consumers. In the near future, digital broadcast television systems will provide many more programming choices for consumers.

In addition to television programming delivered through television program delivery systems, other programs and events may be sent to consumers. These other programs and events include streaming video sent over wired and unwired, narrowband to broadband services, digital audio programs, and other multimedia data.

Unfortunately, customers are still limited in their television viewing choices by the local and regional nature of television delivery systems. For example, a broadcaster in Boston may provide programming of local interests to people in Massachusetts while a broadcaster in Seattle may provide different programming to people in the Seattle area. A person in Boston generally cannot access Seattle programming, other than programming that is provided at a national level.

In addition to this local/regional market segregation, many other sources of programming and events may not be available in a specific viewing area. These other sources may include audio programming, streaming video, local or closed circuit television programming (e.g., education television programming provided by a state education department) and other programming.

Even if certain programming is available in a local viewing area, a viewer may not be aware of its existence. This situation may be the result of a large array of available programming coupled with a limited program menu or guide. The program guide may be limited in that not all available programming can be listed, some programming changes occur that are not reflected in the program guide, and errors may exist in the program guide. In addition, the more comprehensive the program guide, the harder it is for the viewer to search and navigate the program guide to find a desired program.

SUMMARY

The problems noted above are solved by the video and digital multimedia aggregator system and method described herein. Program content can be packaged and delivered by the system, including video, television, radio, audio, multimedia, computer software, and electronic books, or any content that can be delivered in digital format.

The aggregator comprises a request and results processing server, a search engine server coupled to the request and results processing server and a content acquisition server coupled to the request and results processing server. The request and results processing server receives a request for a program, the search engine server searches for the program and the content acquisition server acquires a program for delivery to the user. The request and results processing server includes a search request processor that receives information related to the user's search request and provides the information to a search results form builder that creates an electronic search request. The search request may be augmented by using a content search suggestion engine to add additional search terms and descriptions to the search request. The aggregator may also include a decoder that decodes program content and program metadata from remote sources for storage at the aggregator, and an encoder that encodes content metadata and programs for delivery to the user. The aggregator may also comprise one or more crawlers, such as a content crawler, to look for program content in the digital communications network.

The search engine server searches at least a local content database. The local content database comprises at least two file types. A content file includes a complete program content file. For example, the 1997 movie *Titanic* may exist in the local content database as a complete program content file. The complete program content file may also include a reference file or metadata that contains additional information related to the content. Such additional information in the reference file may include: a program description, including program rating, program description, video clips, program length, format (e.g., 4×3 television or 16×9 movies), and other information; billing information and digital rights management information; viewing statistics, including number of times viewed, dates/times viewed, identity of users viewing the program; advertisement information to allow ads to be inserted during viewing of the program; and other information.

The additional information in the reference file may be provided in whole or in part to the system users. For example, the aggregator may provide a program description and accompanying video clips to selected systems users. The reference file may also be used by the aggregator for system administration purposes. For example, billing and digital rights management information may be used to collect appropriate fees from system users and to provide such collected fees to the entities owning rights in the content.

A remote content crawler continually crawls the digital communication network looking for content to provide to the aggregator. The content provided to the aggregator may be stored in a form of an entire content file. For example, the content may include an entire movie, television program or electronic book. Alternatively, the content provided to the aggregator may be a reference to a content file that is stored at, or that will be available at one of the remote locations. For example, the content may be a reference to a future, scheduled live sports event that will be made available to system users. The sports event may be provided for a one time fee, as part of a sports package, for which a fee is collected, or as a free event. In the examples discussed above, the content may be stored at the aggregator, and may subsequently be provided to system users. For the example of the live sports event, the aggregator may store the live sports event and may then provide the sports event as a replay, in addition to facilitating live viewing of the sports event.

DESCRIPTION OF THE DRAWINGS

The detailed description will refer to the following drawings in which like numerals refer to like elements, and in which.

DETAILED DESCRIPTION

Figure 1:
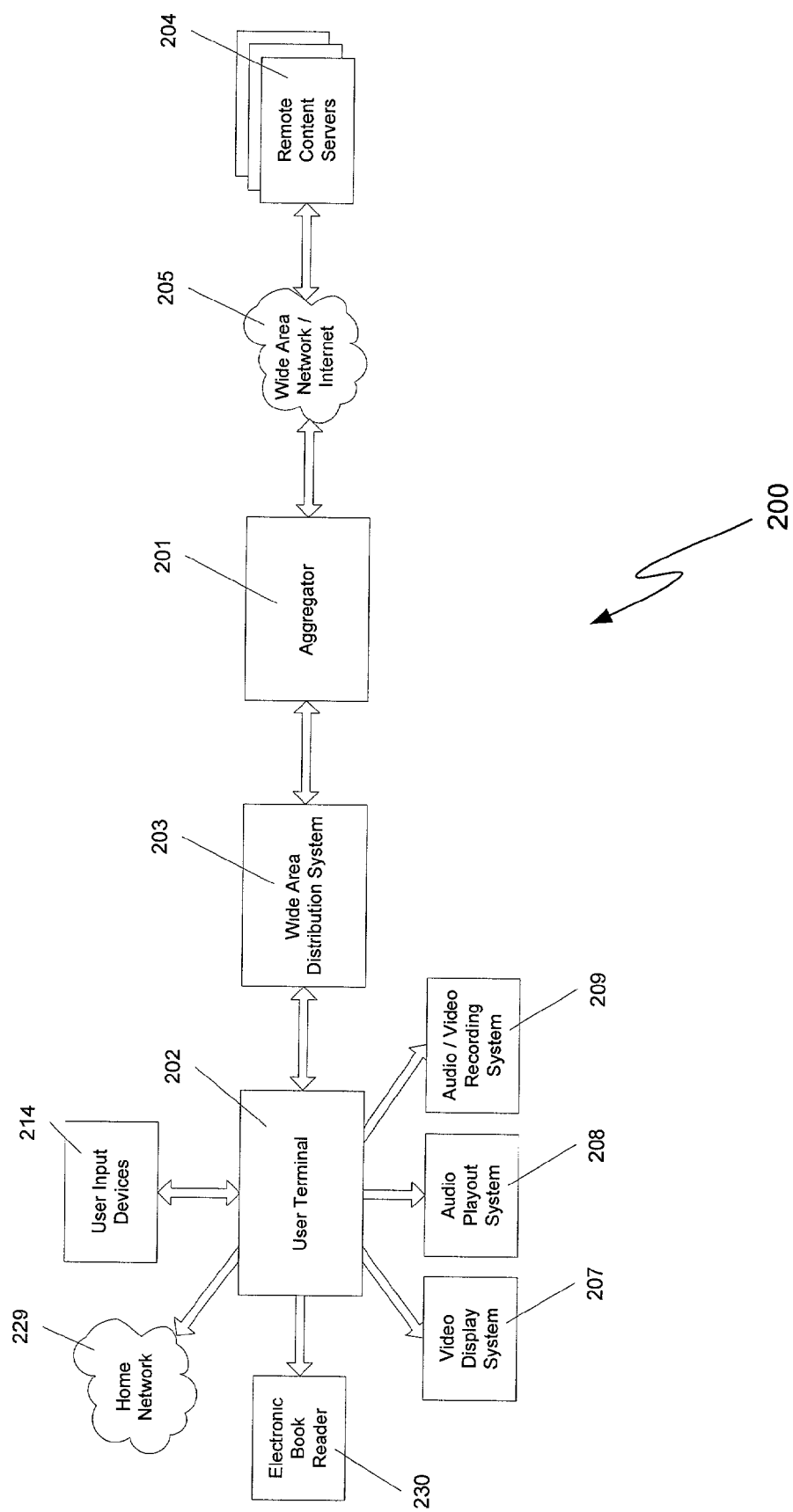
FIG. 1 is a block diagram of primary components of a content search, packaging, and delivery system.

FIG. 1 is a block diagram of a content search, packaging, and delivery system 200. The content to be packaged and delivered by the system 200 includes video, television, radio, audio, multimedia, computer software and electronic books. Components of the system 200 include an aggregator 201 and a user terminal 202, which are connected using a wide area distribution system 203. Other components are remote content servers 204 that exchange data with the aggregator 201 using a wide area network/Internet 205 connection. The user terminal 202 may incorporate a video display system 207, an audio playout system 208, an audio/video recording system 209, user input devices 214, an electronic book reader 230, and a connection to a home network 229 to interact with other devices in the user's home environment. Alternatively, one or more or all of the video display system 207, the audio playout system 208, the audio/video recording system 209, and the electronic book reader 230 may be separate components that are coupled to the user terminal 202.

Figure 4:
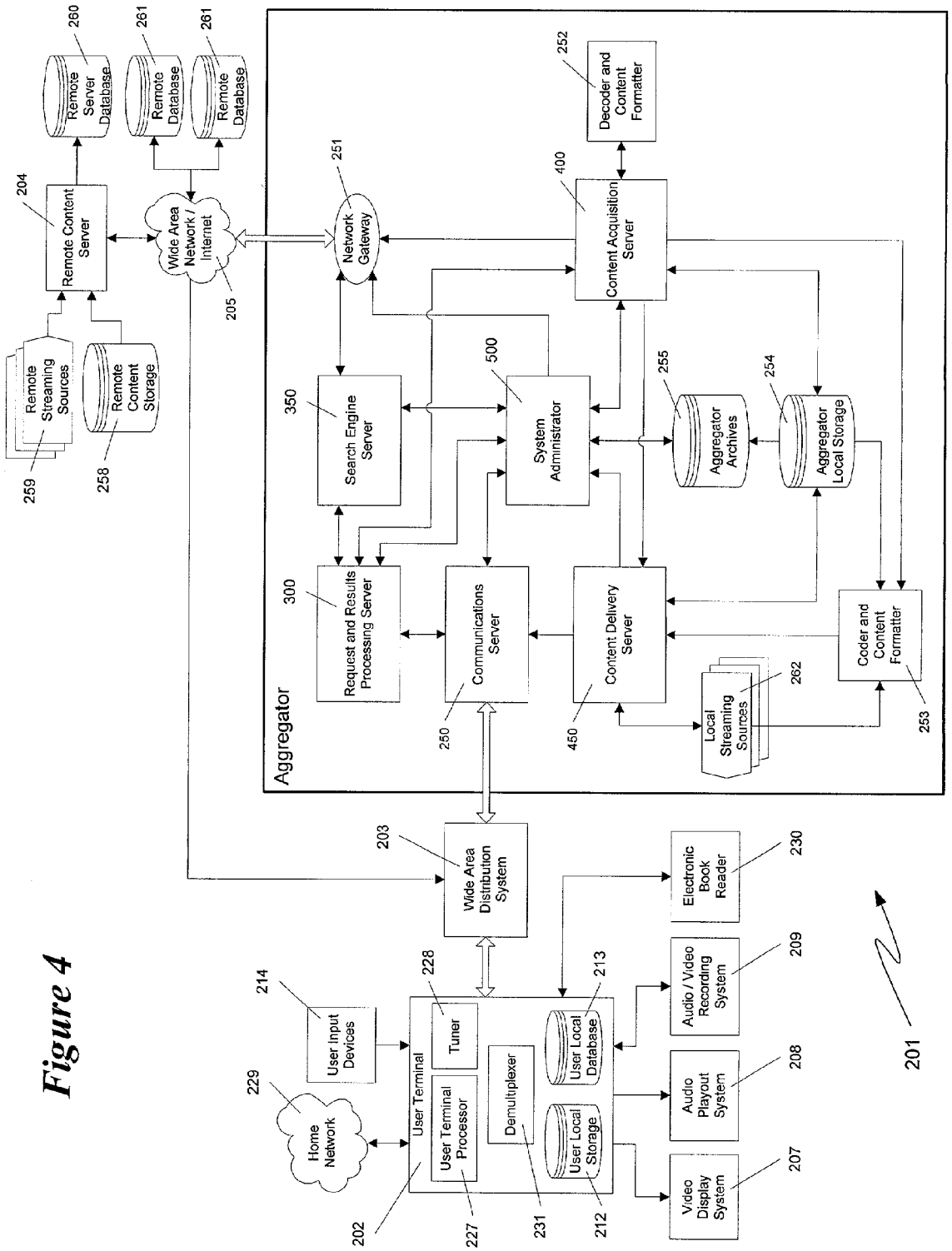
FIG. 4 is a schematic of the components of the content search, packaging, and delivery system showing subsystems of an aggregator, a user terminal, and a remote content server.

The system 200 allows a user to enter search parameters, such as keywords and category headings, and have the aggregator 201 use these parameters to locate, package, and deliver content to the user terminal 202 from numerous sources. The requests and content deliveries can be sent over communications links including, but not limited to, telephone lines, coaxial cable, fiber-optic cable, wireless connections, wide area networks, the Internet, and other communication media collectively represented by the wide area distribution system 203. The numerous sources of content are shown in FIG. 4 and include, but are not limited to, an aggregator local storage 254, local streaming sources 262, remote content storage 258, and remote streaming sources 259. In an embodiment, the local streaming sources 262 are comprised of the audio and video channels being delivered using a cable television headend system that may house the aggregator 201.

The system 200 will take a user's search request and may perform a search of virtually every active and scheduled radio and television source in the world, as well as archived sources of video and audio programming such as movies and recorded audio sources and sources of other multimedia, software, and electronic book content. In an embodiment, the system 200 will also search Internet Web sites and other online databases. The user will then be able to select programming or other content for download based on the search results. In an embodiment, the download, or delivery, process can be fulfilled by making the content available on a specific channel of a cable television system, or by transmitting the content using a digital communications protocol, such as the Internet standard TCP/IP, for example. In addition, the system 200 is capable of formulating and presenting a list of suggested content based on an analysis of the user's current search parameters, stored information about previous searches and previously selected content downloads and other user-specific or related information. The system 200 is also capable of notifying a user prior to the start time of selected programming and availability of other content using such notification as an electronic mail message and/or an on-screen message indicating that the scheduled program will be broadcast at a specified time. The system 200 may support one or more digital rights management (DRM) systems to track the usage and copyrights associated with downloaded content and bill the user's account as appropriate and provide any license and usage fees to the content provider. The system 200 may implement a users' privacy protection scheme allowing users to control what information is gathered, limit what is done with that information, and review and delete a user's profile if desired.

Figure 2:
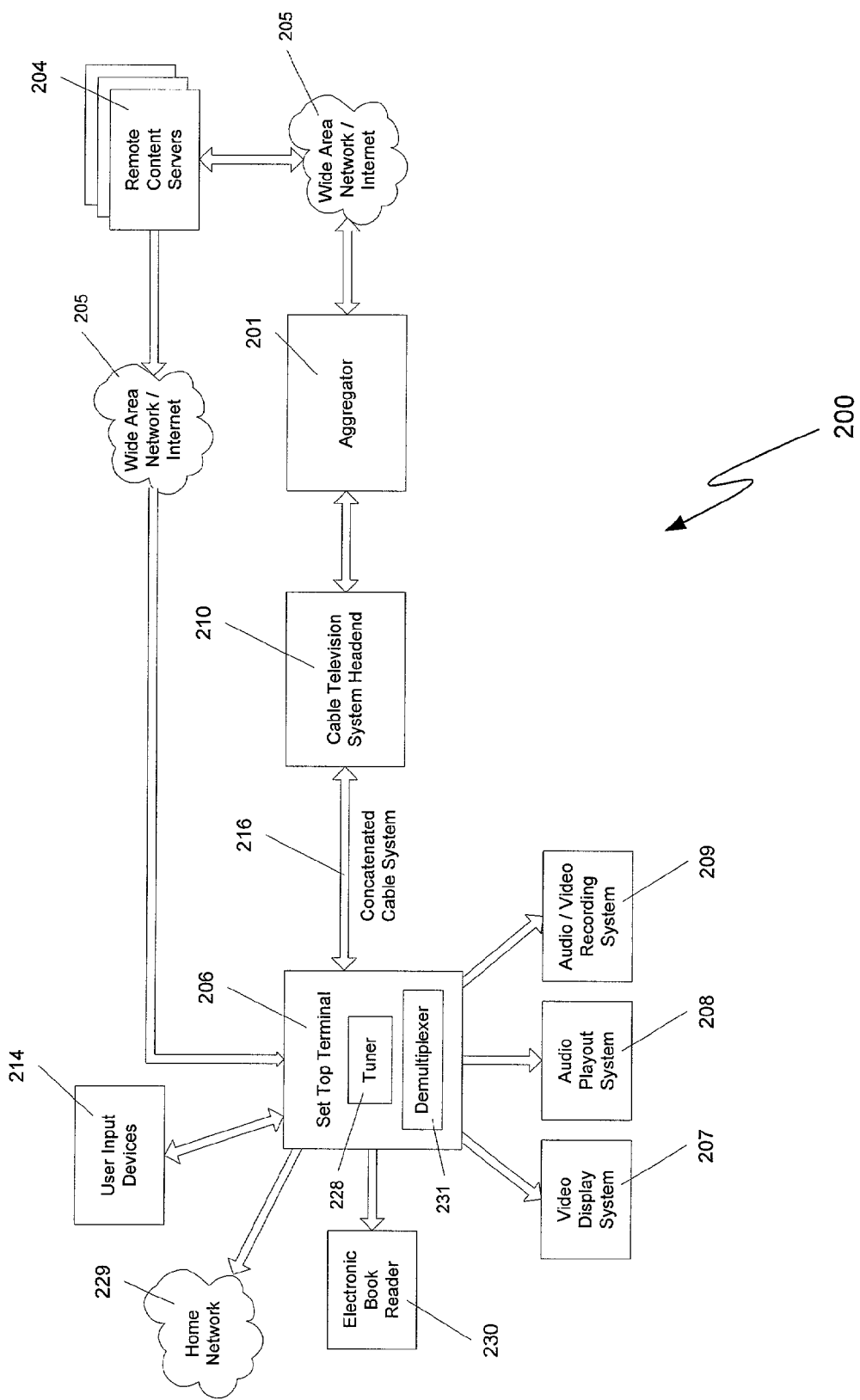
FIG. 2 is a block diagram of the components of the content search, packaging, and delivery system configured to deliver content to a set top terminal.

An overview of an embodiment of the system 200 is shown in FIG. 2 where the user terminal 202 is a set top terminal 206 that communicates with the aggregator 201 through a cable television system headend 210, thereby making use of the cable television system headend 210 high bandwidth concatenated cable system 216. The set top terminal 206 system may include a tuner 228, a demultiplexer 231, the video display system 207, the audio playout system 208, the audio/video recording system 209, user input devices 214, an electronic book reader 230, and a connection to the user's home network 229. These components are used to tune, select, view, listen to, and store audio and video programming and other content delivered by the system 200. FIG. 2 also shows a communications path from one or more remote content servers 204 through the wide area network/Internet 205 directly to the set top terminal 206, which bypasses the aggregator 201 and cable television system headend 210. This path may be used in the case where the requested content is available in the required format from the remote content server 204 and is authorized for direct delivery to the user. In an alternative embodiment, the aggregator 201 is collocated with the cable television system headend 210 that is acting as the wide area distribution system 203 as is the case when a cable television system is also serving as the user's Internet service provider.

Figure 3:
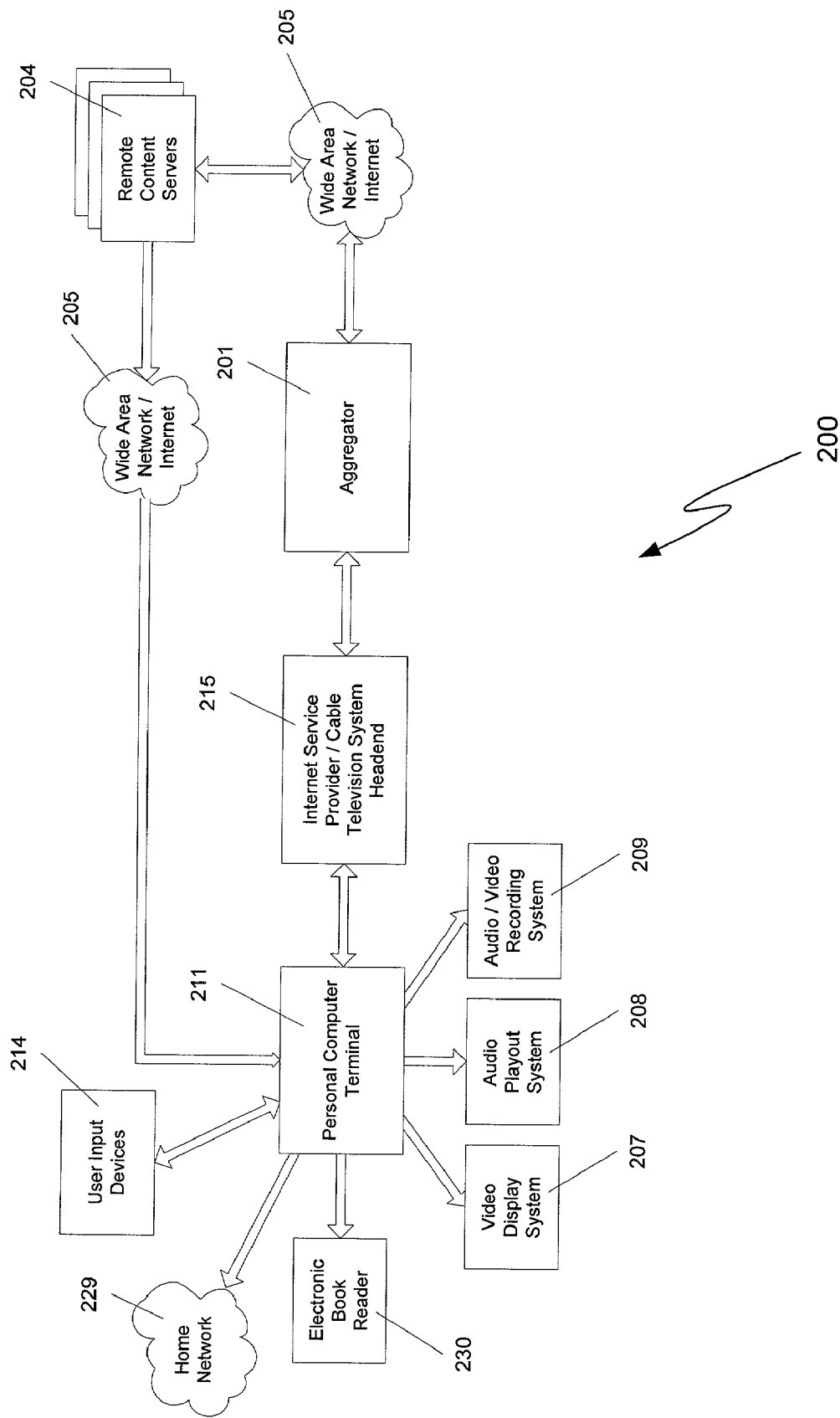
FIG. 3 is a block diagram of the components of the content search, packaging, and delivery system configured to deliver content to a personal computer terminal.

An overview of another embodiment of the system 200 is shown in FIG. 3, where the user terminal 202 is a personal computer terminal 211 that communicates with the aggregator 201 through an Internet service provider/cable television system headend 215. In this case, the content may be delivered by a cable television headend that is operating as an Internet service provider (ISP). The personal computer terminal 211 may also include the video display system 207, the audio playout system 208, the audio/video recording system 209, user input device 214, the electronic book reader 230, and the connection to the home network 229. A communications path also exists from one or more remote content servers 204 through the wide area network/Internet 205 directly to the personal computer terminal 211. This communications path bypasses the aggregator 201 and the Internet service provider/ cable television system headend 215 in the case where requested content is in the required format and is authorized for direct delivery to the user.

The user can receive video and audio programs (i.e., the content) in a number of different ways. First, the tuner 228 in the user terminal 202, shown in FIG. 2, can simply tune to the desired program, or the demultiplexer 231 can select a program from a digital multiplex, thereby displaying the program at the appropriate time. However, the desired program may not be broadcast by the user's cable television system headend 210, or the user may want to watch a program that is supplied by the local headend, but not subscribed to by the user, e.g., a boxing match broadcast by a premium channel that the user does not ordinarily receive. In these examples, the program can be delivered to the user by the aggregator 201 using telephone lines, fiber-optic transmission lines, or other communication media, or using the cable television system headend 210. In an embodiment, the aggregator 201 can supply the desired program to the user by pulling programs from program delivery systems in the United States and abroad and delivering the program to system users. Therefore, a user can have access to programs outside the user's normal viewing area.

FIG. 4 shows the system 200 and system components in more detail. At a user's location, the user terminal 202 includes the tuner 228, the demultiplexer 231, a user terminal processor 227, user local storage 212 and user local database 213. Coupled to the user terminal 202 may be the user input devices 214, the video display system 207, the audio playout system 208, the audio/video recording system 209, an electronic book reader 230, and a connection to the home network 229.

The user terminal 202 is coupled through the wide area distribution system 203 to the aggregator 201 and further through the wide area network/Internet 205 to remote program sources. The remote program sources include the remote streaming sources 259 and the remote central storage 258. The remote program sources also include remote databases 261 and, through the remote content server 204, a remote server database 260.

The aggregator 201 may include a communications server 250 that communicates with the user terminal 202 through the wide area distribution system 203. The communications server 250 receives inputs from a request and results processing server 300, a content delivery server 450 and a system administrator 500. The content delivery server 450 receives inputs from a coder and content formatter 253 and a content acquisition server 400. The content delivery server 450 also accesses the aggregator local storage 254 and the local streaming sources 262. Finally, the content delivery server 450 provides an output to the system administrator 500.

The coder and content formatter 253 receives inputs from the content acquisition server 400, the aggregator local storage 254 and the local streaming sources 262. The system administrator 500 receives inputs from the content and delivery server 450, and communicates with the content acquisition server 400, the request and results processing server 300, a search engine server 350 and aggregator archives 255. A decoder and content formatter 252 is coupled to the content acquisition server 400. Finally, a network gateway 251 couples components of the aggregator 201 with the remote content server 204 through the wide area network/Internet 205.

Programs received at the aggregator 201 may be input to the formatter 253. The formatter 253 reformats, as necessary, all input content into a format that is readily received by the user terminals 202 operably connected to the system 200. In addition, the formatter 253 can store full or partial copies of content in compressed form in the aggregator local storage 254. The aggregator 201 can provide real-time delivery of certain content, such as a boxing match. In an embodiment, if a large number of users want a particular live program, then the cable television system headend 210 (see FIG. 2) can broadcast the program on a particular channel available to all the requesters instead of broadcasting the program to each individual user over the wide area distribution system 203. In addition to delivery from a cable television headend, content may be provided by a satellite delivery system, over-the-air-broadcast, and through the Internet. See U.S. patent application Ser. No. 09/191,520, entitled Digital Broadcast Program Ordering, hereby incorporated by reference, for additional details of broadcast program delivery.

The aggregator 201 can also implement a screening process for limiting the number of programs captured to those programs with a viewing audience above a predetermined threshold. The aggregator 201 may contain a filter that will pass only programs meeting the predetermined selection criteria. The filter may include programming that screens the content to reject specific items, such as adult content, for example.

The system administrator 500 records what fees should be paid and to whom. For example, the aggregator 201 will determine to whom any copyright or other fees should be paid when a program is broadcast.

The user terminal 202 may be a television, a set top terminal 206, a personal computer terminal 211 (not shown), or any device capable of receiving digital or analog data, or some combination thereof. The user terminal 202 is equipped with the user input devices 214 that communicate search criteria to the system 200 as well as navigate through the user terminal menu system and control the user terminal's other various functions. The user local storage 212 is used to store and archive content onto one or more removable and/or non-removable storage devices or media for later access. Removable storage media may include, but is not limited to, magnetic tape, magnetic disks, optical disks and modules, and electronic memory cartridges. The user local database 213 may store relevant information about a user's profile and account. This information includes, but is not limited to, user name, password, personal information that the user has authorized for storage, billing information, other users allowed access to the account, past search criteria, past content download information, and library information about stored content. As a consumer protection device, the user terminal 202 may enable the user to view the information stored in the user local database 213 and modify certain data fields and select which data fields may be reported to a main system database (not shown) within the aggregator 201. Certain fields including, but not limited to, account numbers and billing information may not be allowed this level of user access.

The user terminal processor 227 may include a central processing unit and all associated hardware, software, and firmware modules to perform all operations within the user terminal 202. These operations include, but are not limited to, managing communications with the aggregator 201 and other networked devices, processing search and download requests, displaying search and download results, managing and controlling communications with the user local storage 212 and the user local database 213, responding to user interaction with presentation of graphical user interface (GUI) menus, playing out selected programming content using various audio and video output devices, implementing the user's part of the digital rights management schema, and administering the user's account and billing. The tuner 228 and the demultiplexer 231 are used to select an audio/video channel for playout from the channels available on the cable television system 216.

In an embodiment, the user terminal 202 may incorporate selected features of the aggregator 201. For example, the user terminal 202 may include a small metadata crawler, an aggregator, and program content and program metadata storage.

The user terminal 202 communicates with the aggregator 201 using the wide area distribution system 203. Within the aggregator 201, the communications server 250 acts as the interface point to the wide area distribution system 203 for the purpose of managing primary communications to system users. The communications server 250 routes incoming user requests and associated user information to the request and results processing server 300, routes search results and content downloads through the wide area distribution system 203 to end users, and routes billing information from the customer billing server 506 (see FIG. 10) to the end users. The request and results processing server 300 performs the basic processing and routing related to user search requests, content download requests, administrative information requests, search results, related content suggestions, and programming notification.

Figure 5:
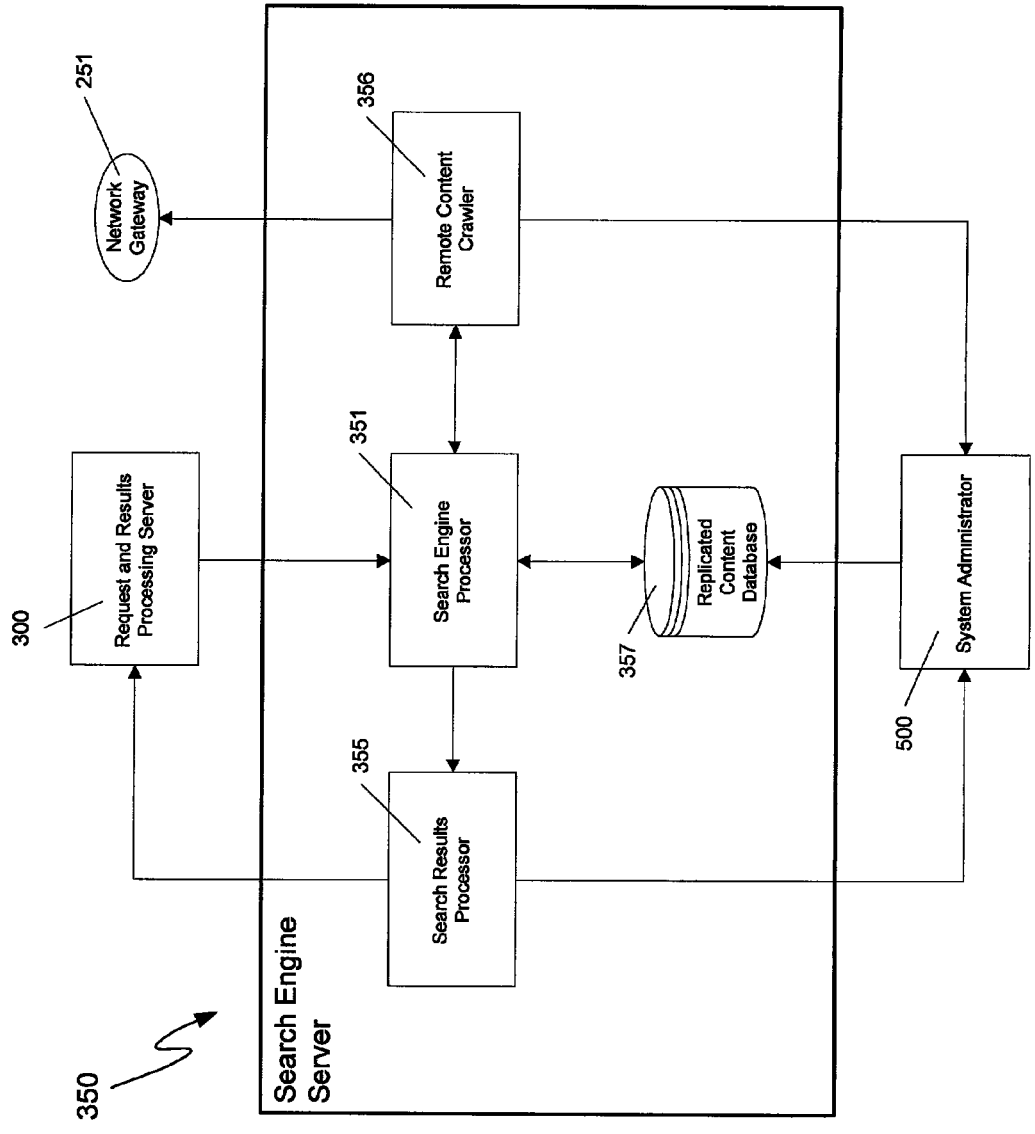
FIG. 5 is a schematic of a search engine server used with the content search, packaging, and delivery system.

The search engine server 350, shown in FIG. 5, receives an augmented search request form and performs a search of databases of all known programming content, both local and remote, and builds a hierarchical list of results based on how well each result compared to the search criteria. The search engine server 350 contains a replicated content database 357 to be able to perform searches more efficiently and maintains a list of active searches to which new content listings are compared. Periodically, the search engine server 350 thoroughly searches, or crawls using a remote content crawler 356, all available sources of programming and other content, retrieves all information about all content not previously logged into the system and enters that data into the aggregator local database 501 (see FIG. 4). In an embodiment, the search engine server 350 may directly access remotely stored content and analyze and retrieve metadata from the stored digital files.

Figure 6:
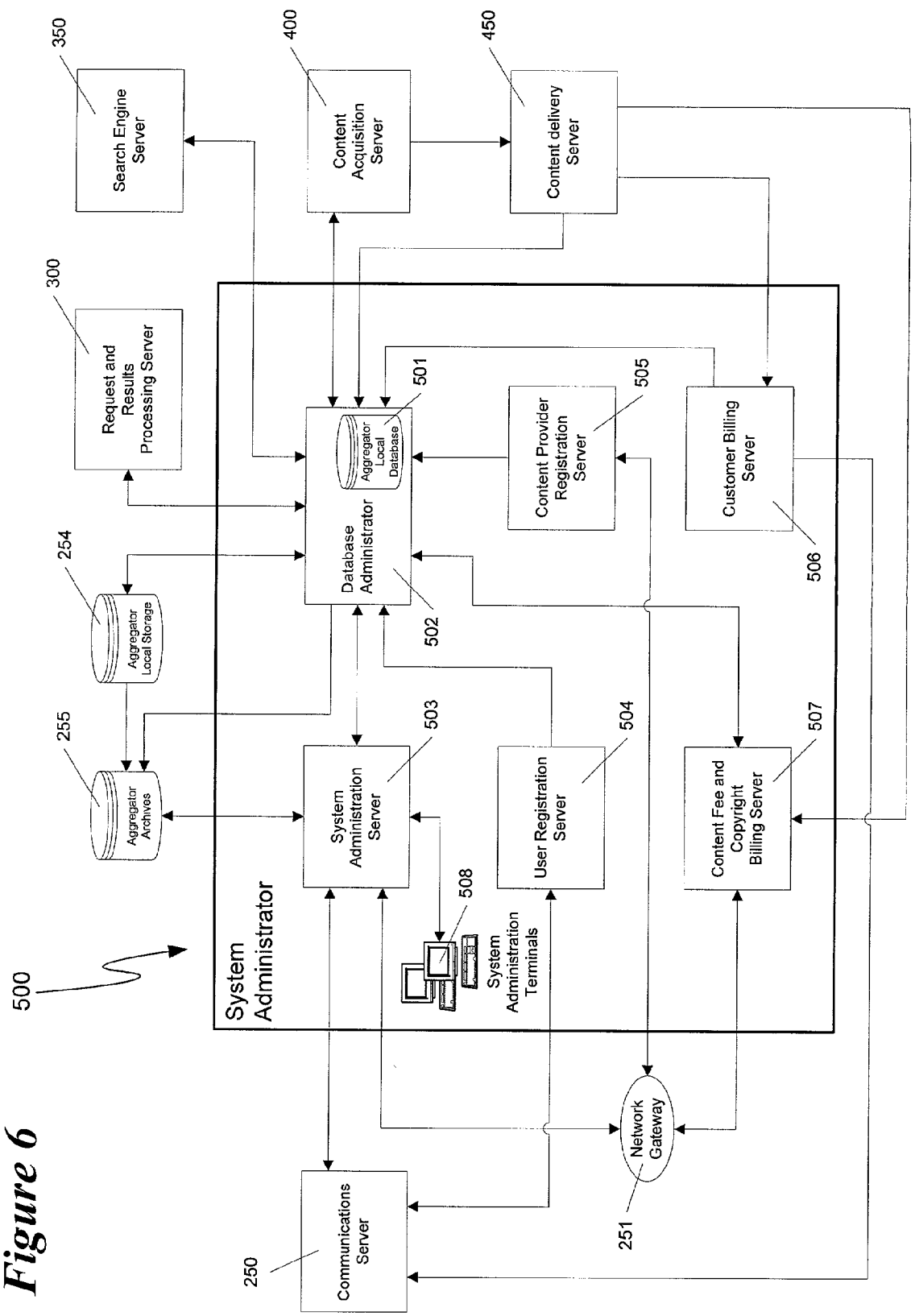
FIG. 6 is a schematic of a system administrator used with the content search, packaging, and delivery system.
Figure 7:
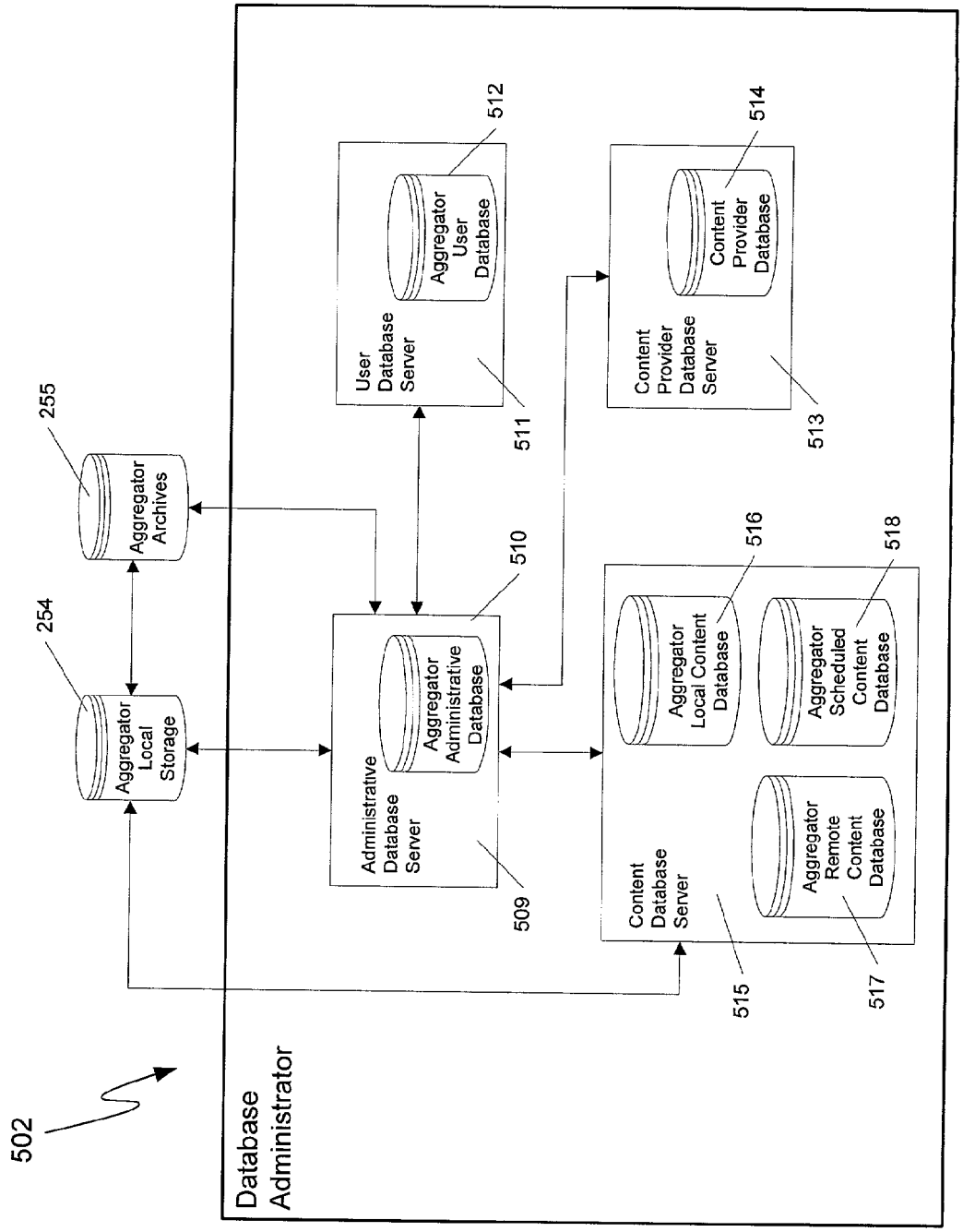
FIG. 7 is a schematic of a database administrator used with the content search packaging, and delivery system.

A database administrator 502, shown in detail in FIG. 7, as part of the system administrator 500 (see FIG. 6) maintains the aggregator local database 501 and interfaces with the various components of the aggregator 201 that retrieve information from and store information to the aggregator local database 501. The database administrator 502 controls several database servers. A group of individual databases maintained within the database administrator 502 constitutes the aggregator local database 501. An administrative database server 509 maintains an aggregator administrative database 510, which stores and processes information including, but not limited to, authorized system administrators, passwords, and administrator usage rights. The administrative database server 509 also governs replication of all databases to aggregator local storage 254 and backup of aggregator local storage 254 to the aggregator archives 255. A user database server 511 maintains an aggregator user database 512, which stores and processes information including, but not limited to, user account data, user profile information, user subscription services, user access rights, and past user search and download data (if authorized by the user).

A content provider database server 513 maintains a content provider database 514, which stores and processes information including, but not limited to, a roster of registered content providers and their administrative data, remote provider administrators and their passwords and access rights, and terms of agreements between providers and the operator of the particular aggregator 201. A content database server 515 maintains an aggregator local content database 516, an aggregator remote content database 517, and an aggregator scheduled content database 518. The aggregator local content database 516 stores and processes information including, but not limited to, the catalog of all content stored in the aggregator local storage 254 and all metadata associated with that content. The aggregator remote content database 517 stores and processes information including, but not limited to, the catalog of all content stored in each remote database 261 and all metadata associated with that content. The aggregator scheduled content database 518 stores and processes information including, but not limited to, scheduled broadcast programming content and scheduled streaming program content available to users, available live programming, recurring scheduled programming, and program schedule metadata information.

Figure 8:
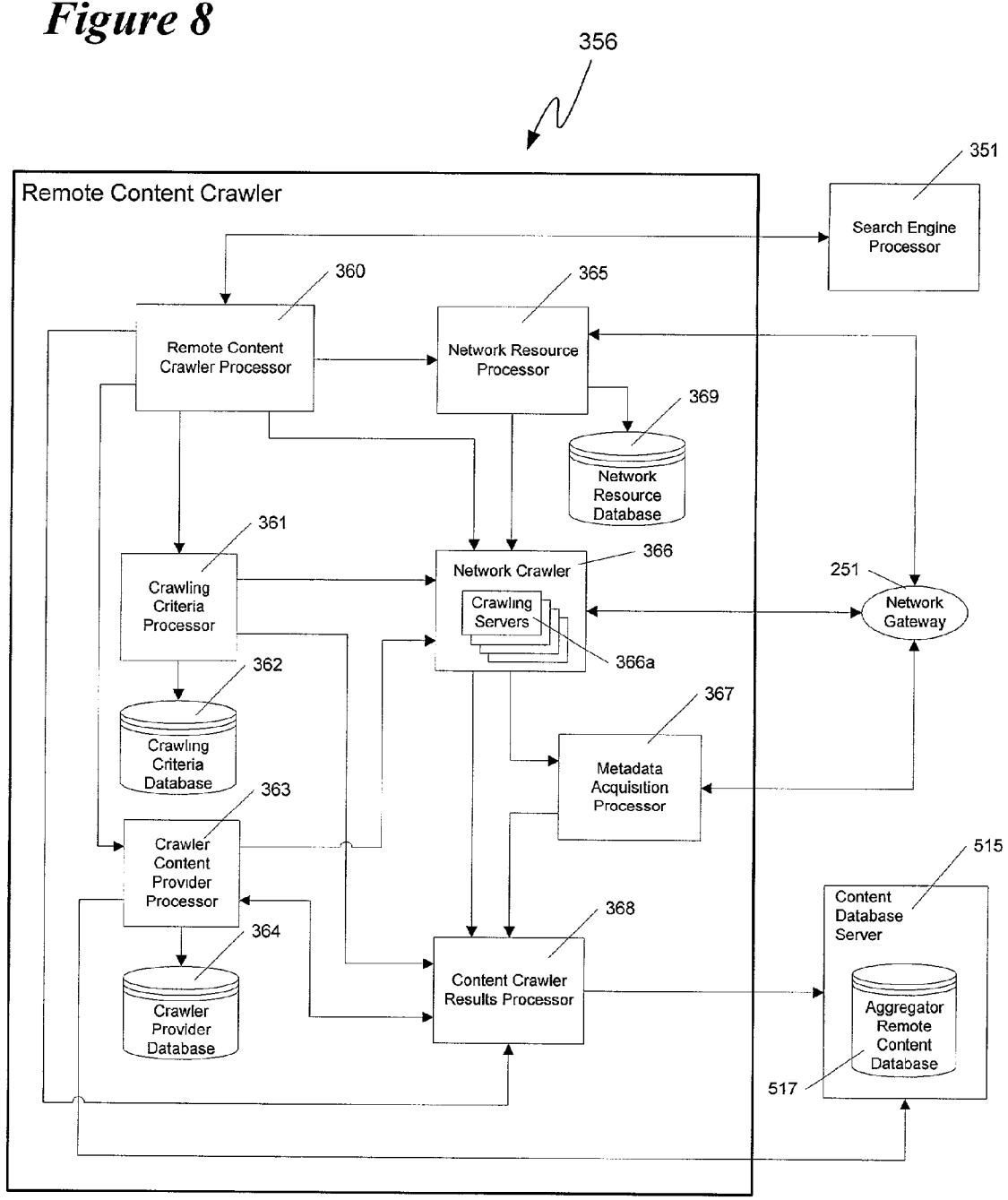
FIG. 8 is a schematic of subsystems of a remote content crawler and components with which the remote content crawler interacts as part of the content search, packaging, and delivery system.

FIG. 8 is a schematic of the components of the remote content crawler 356. The crawler 356 performs the function of thoroughly searching, or crawling, remote computer servers to identify sources of content to be made available to users of the content search, packaging, and delivery system 200. The crawler 356 also indexes the available content, the source location of each piece of content, and information about the content provider and routes the data for storage in the aggregator remote content database 517. The search engine server 350 within the system 200 then conducts content searches within the remote content database 517 to fulfill content search requests received from users of the system 200. Content to be located and indexed by the crawler 356 includes video, television, radio, and audio programming as well as computer multimedia content, computer software, digitized textual content, electronic books, and resources for purchasing or borrowing certain types of content in a physical media format such as audio and video compact discs and physical paper books. The crawler 356 searches remote content servers that are attached to a wide area network that includes the Internet and World Wide Web (henceforth the "network 205"), which the crawler 356 accesses through the network gateway 251. In an embodiment, the crawler 356 may be implemented in the form of a World Wide Web robot, which is a software program that periodically and automatically traverses the network's hypertext structure and retrieves each document and recursively retrieves all documents referenced therein. In the case of the crawler 356, the retrieved data may be compared against crawling criteria so that only web pages and files that are relevant to the system 200 are forwarded and stored in the content database server 515. In an embodiment, the crawler 356 may also access other existing content databases either through public channels or through private channels by means of mutual agreements. The crawler 356 locates appropriate content to be made available to aggregator system 200 users and retrieves all metadata associated with that content and all information required to access that content.

The remote content crawler 356 may include a number of processors and databases as shown in FIG. 8. Alternatively, the remote content crawler 356 may comprise one processor and one database to process data and to store the processed data and any unprocessed data. As shown, the remote content crawler 356 may include a remote content crawler processor 360 that may communicate with and control other components of the remote content crawler 356. In particular, the remote content crawler processor 360 communicates with a network resource processor 365, a crawling criteria processor 361, a crawler content provider processor 363, a network crawler 366, and a content crawler results processor 368. The crawling criteria processor 361 communicates with the network crawler 366 and maintains a crawling criteria database 362. The crawler content provider processor 363 also communicates with the network crawler 366 and the content crawler results processor 368, and maintains a crawler provider database 364. The network resource processor 365 communicates with the network crawler 366 and maintains a network resource database 369. The network crawler 366 may include one or more crawling servers 366a that support the network crawling functions. Finally, the remote content crawler 356 includes a metadata acquisition processor 367 that acquires and processes metadata related to content available to the system 200 through the network gateway 251 from one or more network resources.

The network resource processor 365 builds and maintains the network resource database 369 that contains all known network computer server and remote content server 204 addresses to be used during the network crawling operation. These addresses include top-level domain and subdomain names, Universal Resource Identifiers (URI), Universal Resource Locators (URL), and associated Internet Protocol (IP) address numbers. (For more detail on network addressing, numbering, and domain name service (DNS) conventions refer to *TCP/IP Unleashed, Second Edition*, by Parker and Sportack, and *TCP/IP Blueprints*, by Burk, Bligh, Lee, et al., hereby incorporated by reference.) The resource processor's 365 capacity to index address types may be scalable to accommodate future naming conventions and extensions to the Hypertext Transfer Protocol (HTTP) system in use on the network 205 and may be adaptable to accommodate resource identification and naming schemes of any network protocols that may be implemented in the future. The network resource processor 365 periodically updates its list of domain names and addresses in several ways including querying the aggregator content provider database 514, receiving updated content provider listings from the crawler content provider processor 363 that includes hyperlinked names that were previously undocumented, downloading domain name records from public and private domain name registration databases, synchronizing the local Domain Name Service (DNS) database with all available DNS servers on the network 205, and performing reverse name resolution by locating URLs associated with each allowable IP addressing number. As part of the maintenance of the network resource database 369, the resource processor 365 can verify DNS aliases and duplicate URLs against IP addresses and eliminate redundant domain names. The resource processor 365 may also periodically examine the resource database 369 and may automatically delete dead, or expired, DNS information and links in the database such as the domain name of a content provider that no longer exists or a content resource link that no longer exists. The network resource database 369 may have provisions for additional data to be stored with each resource address. This data can be used by the network crawler 366 to refine crawling and includes data for each URL or address such as the URL owner's identity and contact information, typical content types available, expiration time of the domain name, and subdomain names to be excluded during crawling. In an embodiment, the network resource database 369 may be maintained both by the automatic means described above, as well as manually through human input to system administration terminals 508 (see FIG. 6).

The crawling criteria processor 361 builds and maintains the crawling criteria database 362 that contains search parameters that may be satisfied during the network crawling operation. The criteria database 362 parameters include terms, phrases, keywords, data type descriptions, metadata field names, and metadata type descriptors that are associated with eligible content either as hypertext descriptions or as embedded file and data stream attributes and metadata. Crawling criteria need not be based on content subject matter, but may be based on content type, format, and delivery method. The terms, phrases, and keywords may include a large number of terms and may include terms such as "movie," "television," "watch now," "watch here," "watch movie," "listen now," "listen here," "live stream," "view video," "play film," "program schedule," "program guide," "webcast," "download software," "download here," "purchase video," "purchase CD," "purchase ebook," "download electronic book," "broadcast," "rerun," "episode," "song," "album," "artist," "actor," "musician," "performance," "concert," etc. The criteria processor 361 may identify search parameters automatically and through manual input by system administrators. Automatic means may include analyzing and importing metadata schemes for standardized and proprietary content formats and parsing the metadata field names and descriptive terms to add them to the criteria database 362. The criteria processor 361 may also identify search terms in a reverse fashion by analyzing hypertext associated with desired hyperlinks and analyzing other text proximate to the hyperlink to identify terms that refer to that data type or content category. For example, on a particular news organization's website, one or more links may be determined to point to a common multimedia file format with the text of the site containing the term "newsclip," which would then be added to the criteria database 362. Content data types to be included in the database may include all available industry standards and proprietary delivery formats.

The crawler content provider processor 363 builds and maintains the crawler provider database 364 that contains listings of all known potential providers of content to the system 200 to be used when crawling the network 205 for content and when sorting, filtering, and ranking crawling results. The provider database 364 contains various data points in each provider's database record including the provider's network domain names and addresses to be crawled, listings of content previously and currently available, content types and genres available, tracking data about what content has been downloaded and how often, information about the content provider's business focus areas, participation in industry trade groups and professional societies, consumer ratings and reviews, and internal identification and ranking data. Primary sources for identification of content providers may include the registered content provider database 514, manual entries by system administrators, automatic entries based on indexing of a site's content during network crawling (routine 881 in FIG. 10) and results processing (routines 885, 886 in FIG. 10), and analyzing and parsing lists of corporate members of content related professional societies, standards organizations, and trade groups. The content provider processor 363 receives data back from the crawler results processor 368 about the quantity of eligible content available from a given provider and how often content listings are updated. The content provider processor 363 then uses this and other data including the provider's professional association membership, status as a registered provider, amount of content requested and downloaded by system users, and rating of content provider by system users to rank the provider relative to other content providers. Ranking of content providers may also take into account the organization's core functional areas such as a network broadcaster, movie studio, university, and government agency, for example. In an embodiment, the ranking of content providers determines how frequently the content provider is contacted and crawled over the network 205 and factors into the ranking of search requests results provided to a system user. In another embodiment, the frequency with which a content provider updates content factors into how often that provider's site is crawled. For example, a network broadcast affiliate in a major market offering streaming video feeds and continuously updated content lists may be crawled by the remote content crawler 356 on an almost continuous basis.

Figure 9A:
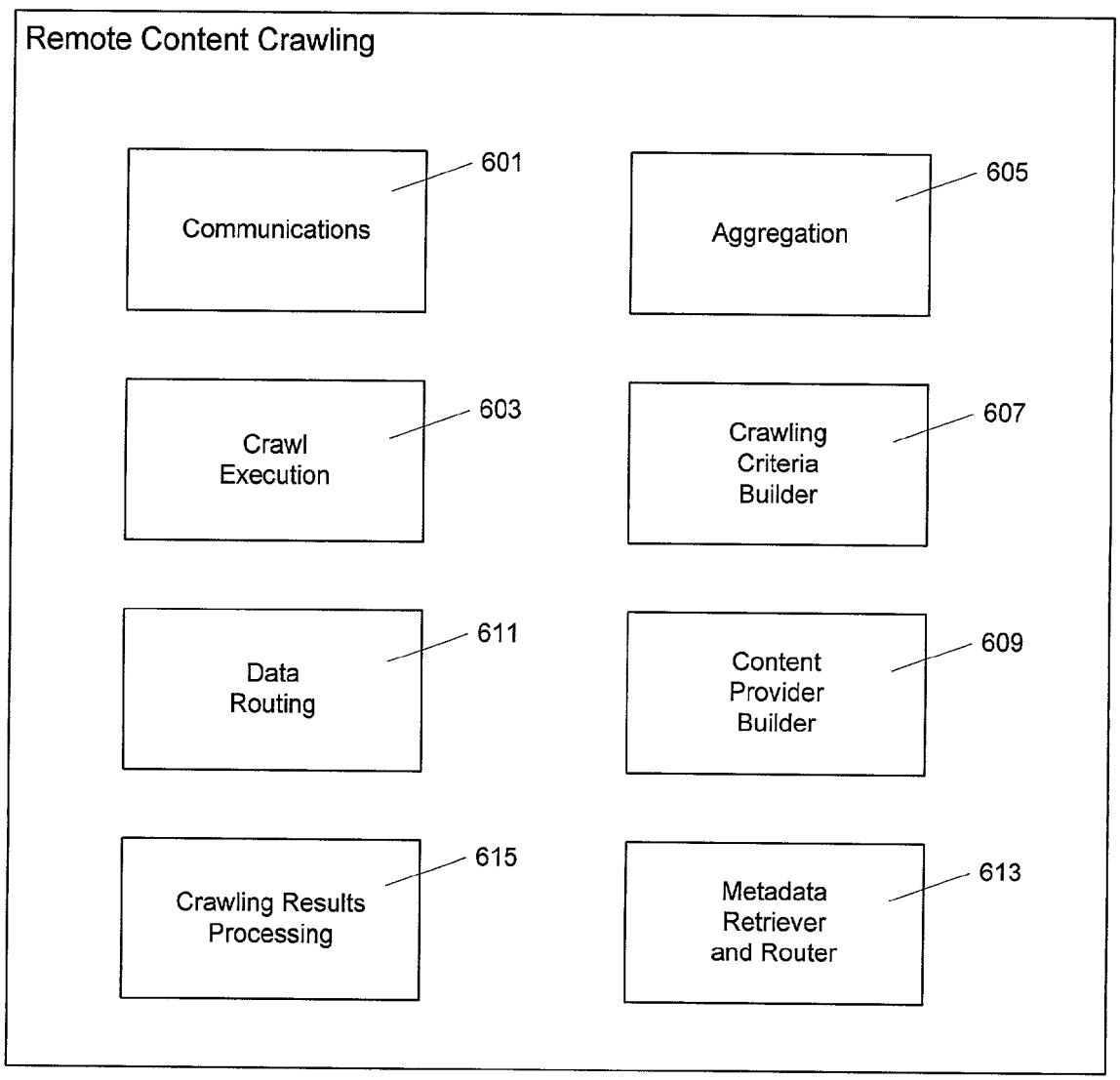
FIG. 9a and 9b are block diagrams of software modules that may be used with the remote content crawler of FIG. 8.

FIG. 9a is a diagram of a remote content crawling module 600 that may reside on one or more of the processors shown in FIG. 4, and may control operation of the remote content crawler 356, including the crawling servers 366a of FIG. 8. In an embodiment, the module 600 may reside on the remote content crawler processor 360.

The module 600 may allow the remote content crawler processor 360 to execute various data search, acquisition, and processing routines. In particular, the module 600 may allow execution of a remote content crawling routine such as that shown in FIG. 10. As shown in FIG. 9a, the module 600 includes a communications module 601 that allows components of the remote content crawler 356 to communicate with other resources of the system 200. For example, the communications module 601 may allow the crawler processor 360 to communicate with the system administrator 500 (see FIG. 6) to receive data concerning scheduling of network crawling, search criteria, and results of prior network crawls.

A crawl execution module 603, which may reside on the network crawler 366, the crawler server 366a and/or other components of the remote content crawler 356, may include several modules that are used to initiate and execute the crawl process. An aggregation module 605 provides routines that allow a processor, such as the network resource processor 365 to aggregate a list of network resources that will subsequently be used to search computer servers connected to the network 205. Network address information for the network resources may be obtained from various sources including uniform resource identifier (URI) and uniform resource locator (URL) databases, Internet domain name databases, Internet protocol (IP) address databases and tables, and system 200 databases such as the registered content provider database 514. The network resource processor 365 maintains this comprehensive network address data in the network resource database 369, which is in turn provided to the network crawler 366. A crawling criteria builder module 607, which may reside, for example, on the crawling criteria processor 361, is used to build and maintain a crawling criteria database 362. The crawling criteria include hypertext search guidelines, data type lists, metadata search criteria, and keyword lists. This data is compiled from sources including the system administrator 500, the search engine server 350, and information returned from processing of previous crawling results. A content provider builder module 609, which may reside on the crawler content provider processor 363, is used to build and maintain the crawler content provider database 364. The crawler content provider processor 363 maintains the crawler content provider database 364, which tracks, indexes, and ranks content providers. Content providers are identified in several ways including a list of those providers that meet crawling criteria, those providers that are registered with the system 200 as content providers, and those providers that are listed in external public and/or private databases of digital content providers such as member lists for professional associations relating to various fields of content, including the Motion Picture Association of America (MPAA), Recording Industry Association of America (RIAA), Association of American Publishers (AAP), and the Software and Information Industry Association (SIIA).

A data routing module 611, which may reside within the crawler processor 360, may direct the network resource processor 365, the criteria processor 361, and the content provider processor 363 to route most recent data sets to the network crawler 366 and may instruct the network crawler 366 to initiate the crawl of the network 205 for content and sources. The data routing module 611 may also route the crawler criteria and content provider data to the content crawler results processor 368 for use in filtering and sorting returned results.

A metadata retriever and router module 613 directs operation of the metadata acquisition processor 367 to retrieve metadata regarding content and to route the retrieved metadata to the content crawler results processor 368. A crawling results processing module 615 is used by the content crawler results processor 368 to index and format the retrieved metadata and to route the indexed and formatted metadata, as a result record, to the crawler content provider processor 363 and to the content database server 515.

Figure 9B:
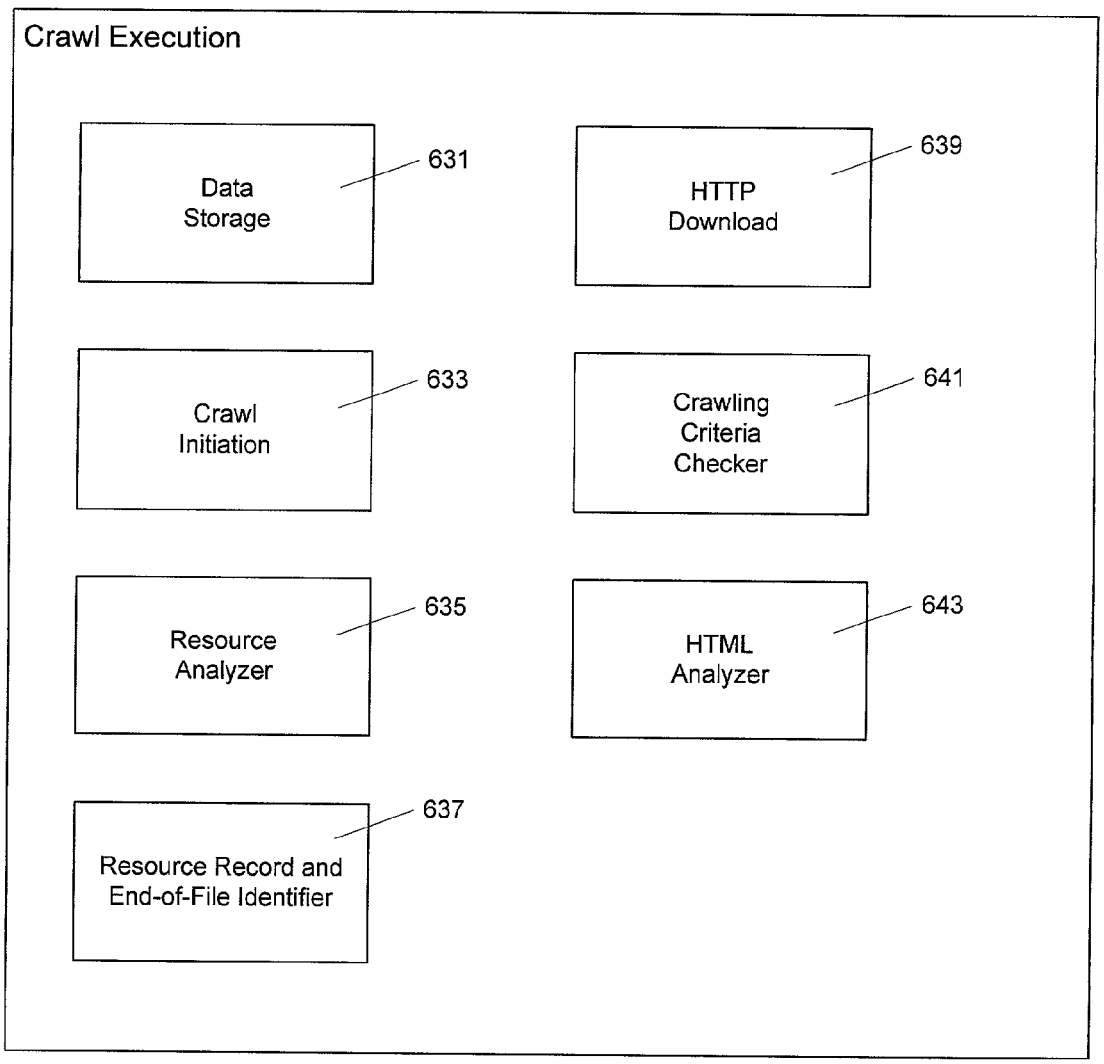

FIG. 9b shows the crawl execution module 603 in detail. Data storage module 631 caches, or stores, data sets. Crawl initiation module 633 exchanges administrative data with the system administrator 500 and initiates the crawling process. Administrative data exchanged with the system administrator 500 includes information about crawling data sets that have been received and about the initiation of the crawling process such as a time stamp for the start of the crawl, internal identifier information for the data sets, and other relevant system status data.

Due to the large number of network resources such as domain names and URLs to be searched, the network crawler 366 may perform the crawling operation using numerous identical or similar crawling servers 366a. Resource analyzer module 635 is used to analyze the entire network resource data set and to subdivide the resource data set into smaller lists based on criteria that may include the overall size of the network resource data set, the optional loading of available crawling servers 366a, the number of crawling servers 366a installed, store administrative data about the smaller lists, and forward each smaller list to a designated crawling server 366a.

Each crawling server 366a starts by reading the first network resource record in its list. Each network resource list has an end of file identification string after the last resource record and end of file identifier module 637 tests the condition of whether the end of file identification string has been loaded as the next network resource. A HTTP download module 639 is used by the crawling server 366a to initiate communications with the target network resource using standard network protocols such as the hypertext transfer protocol (HTTP) and to request and download files containing the desired hypertext web page. A crawling criteria checker module 641 is used to determine if the contents of the hypertext files meet the conditions of the crawling criteria. This is accomplished by parsing the content of the hypertext files and running a comparison algorithm to determine if the hypertext files contain elements listed in the criteria database 362, such as keywords, data type descriptions, and metadata descriptors. If the hypertext file is determined to contain sufficient matching data and the hypertext files are determined to not have been downloaded before or to have been updated since the last download, the hypertext files along with the URL, or network address, of the web page are routed to the content crawler results processor 368 where the hypertext files are cached for further processing. During download and analysis of web pages and other resources, the crawler servers 366a ignore certain embedded data types such as image files that do not contain data that can be compared to the crawling criteria. For example, a television station's website that contains a table representing the station's broadcast schedule along with several image files to be displayed in a web browser may result in only the hypertext of the web page containing the schedule table to be forwarded to the content crawler results processor 368. If the hypertext files of the web page do not meet the crawling criteria, nothing is sent to the content crawler results processor 368.

In addition to crawling hypertext web pages for the designated search criteria, the crawling server 366a may identify and follow links to other web pages and data source locations containing files and streaming data that meet content requirements for the system 200. This process of following links uses HTML analyzer module 643, which analyzes the hypertext structure of data files and identifies, extracts, and caches all hyperlink data. When initially cached, the hyperlinks are designated as not having been crawled. The cached hyperlinks are analyzed to determine if any of the cached hyperlinks remain to be crawled. When all cached hyperlinks have been crawled, the next resource record contained in the network resource list for the crawling server 366a is loaded. If a hyperlink remains to be crawled, the crawling server analyzes the structure of the hyperlink to determine if the hyperlink points to, or lists the address to, another set of hypertext files representing a web page. If so, the hypertext page is analyzed and any hyperlinks contained therein are added to the hyperlink cache. The crawling server 366a indexes web sites of interest and caches hyperlinks under that particular domain. If the hyperlink does not point to additional hypertext files, the hyperlink likely references a stored data file or a data-streaming source. The resource referenced by the hyperlink is accessed to determine if the resource is a data source, file, or data transport stream. The target resource of the hyperlink may then be accessed and analyzed to determine if the resource is a data source that meets content type requirements within the crawling criteria database 362. If the target resource meets content type requirements and the hypertext containing the link satisfies the crawling criteria, then the text of the hyperlink and data concerning the target resource are sent to the content crawler results processor 368. If the target resource meets content type requirements, but the resource's associated hypertext files do not meet the original crawling criteria, the hyperlink data and network resource address are routed to the metadata acquisition processor 367, which may extract metadata from the target source itself. When an end-of-file string of the resource record listing has been reached, the crawling has been completed and administrative data concerning the crawling operation is logged with the system administrator 500. The recursive processing of hypertext and hyperlinks performed by the network crawler 366, effectively accesses every web page, data file, and data stream available under every known domain name and network resource and retrieves all addressing data and content metadata from those sources required by the system 200 to fully describe and access that digital content.

The above description referred to data processing and crawling operations performed by the crawling servers 366a. However, the same operation may, based on a number of network resources to be crawled, be carried out by the network crawler 366.

Figure 10:
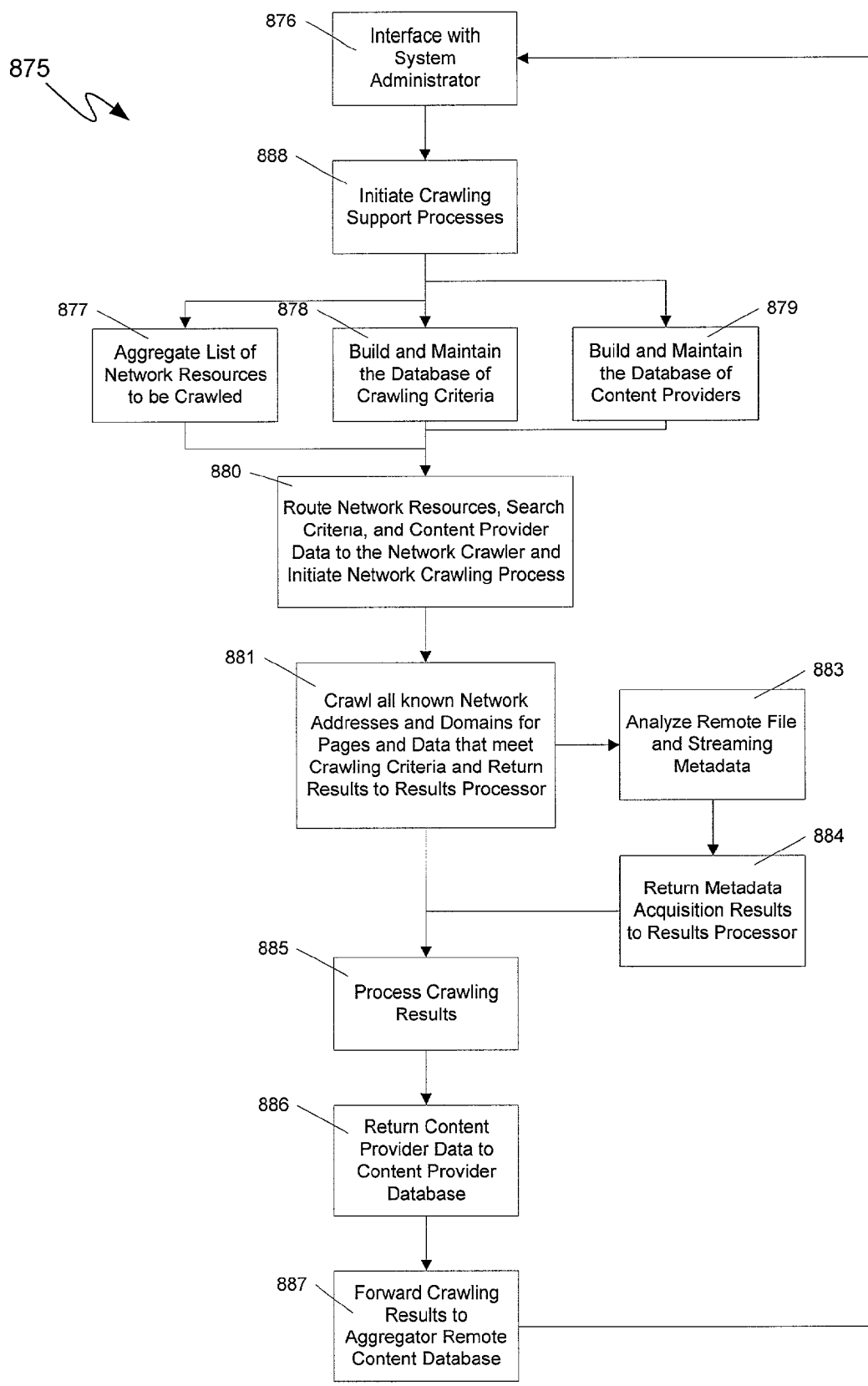
FIG. 10 shows a flowchart describing the process of establishing remote content crawling parameters, performing the remote content crawling, and processing the results.

FIG. 10 shows a remote crawling operation 875 performed by the remote content crawler 356 and the various modules that comprise the remote content crawling module 600. A remote content crawler processor 360 manages several basic functions to locate and index desired content. The crawler processor 360 communicates with the system administrator 500 (routine 876) to receive data concerning scheduling of network crawling and search criteria and to log administrative data about a previous network crawl. Routine 876 then initiates three parallel functions that support the remote content crawling. First, routine 877 within a network resource processor 365 aggregates a list of network resource addresses required to perform a search of effectively every computer server attached to the network 205. The network resource processor 365 obtains this network address information from various sources including uniform resource identifier (URI) and uniform resource locator (URL) databases, Internet domain name databases, Internet protocol (IP) address databases and tables, and internal aggregator system 201 databases such as the registered content provider database 514. The network resource processor 365 maintains this comprehensive network address data in the network resource database 369, which is in turn provided to the network crawler 366 by routine 880. A second parallel process, routine 878, is performed by the crawling criteria processor 361, which builds and maintains the crawling criteria database 362. The crawling criteria include hypertext search guidelines, data type lists, metadata search criteria, and keyword lists. This data is compiled from sources including the system administrator 500, the search engine server 350, and information returned from processing of previous crawling results. A third parallel activity is building and maintaining the crawler content provider database 364, which is performed by a crawler content provider processor 363 (routine 879). The crawler content provider processor 363 maintains the database 364, which tracks, indexes, and ranks content providers. Content providers are identified in several ways including a list of those providers that meet crawling criteria, those that are registered with the system 200 as content providers, and those that are listed in external public databases of digital content providers such as member lists for professional associations relating to various fields of content, including the Motion Picture Association of America (MPAA), Recording Industry Association of America (RIAA), Association of American Publishers (AAP), and the Software and Information Industry Association (SIIA).

Routine 880 within the crawler processor 360 then directs the network resource processor 365, the criteria processor 361, and the content provider processor 363 to route their most recent data sets to the network crawler 366 and instructs the network crawler 366 to initiate the crawl of the network for content and sources. Routine 880 also routes the crawler criteria and content provider data to the content crawler results processor 368 for use in filtering and sorting returned results. By executing routine 881, the network crawler 366 uses information provided by the criteria processor 361 and the content provider processor 363 to crawl every known network resource and remote content server 204 for qualifying digital content. The crawl of the wide area network and Internet 205 is performed through the network gateway 251. The network crawler 366 routes content data results to the content crawler results processor 368, routine 881. In some cases, the returned content data will indicate that a possible qualifying piece of content is located on a remote server as a single computer file, a set of computer files, or a continuous data stream that does not have sufficient descriptive data available on the remote server to determine whether that content should be indexed. When this happens, the network crawler 366 can direct the metadata acquisition processor 367 to retrieve metadata about the content directly from a content file(s) and/or digital media stream using routine 883 and return the metadata to the content crawler results processor 368 using routine 884. The results processor 368 sorts the content data results according to the crawling criteria, and by content provider, and indexes and formats each result record, routine 885. The content crawler results processor 368 then routes data about the discovered content providers to the crawler content provider processor 363, routine 886. Upon execution of routine 887, the content crawler results processor 368 routes the sorted and formatted crawling results to the content database server 515, which updates the aggregator remote content database 517.

The final steps in routine 880 shown in FIG. 10 are to route network resource, crawling criteria, and content provider data sets to the network crawler 366 and instruct the network crawler 366 to initiate the crawling process.

Figure 11A:
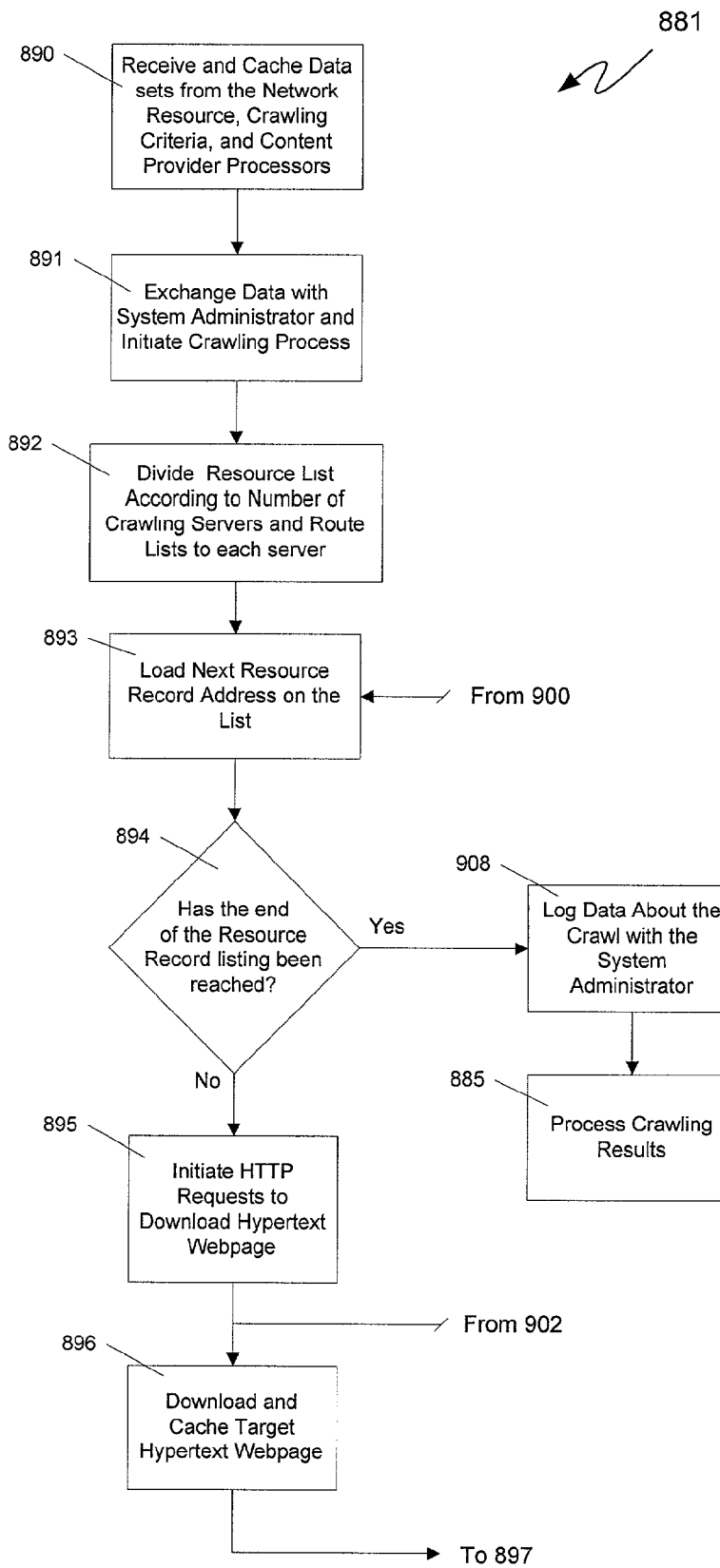
FIGS. 11a and 11b show a flowchart describing in detail the wide area network crawling process.
Figure 11B:
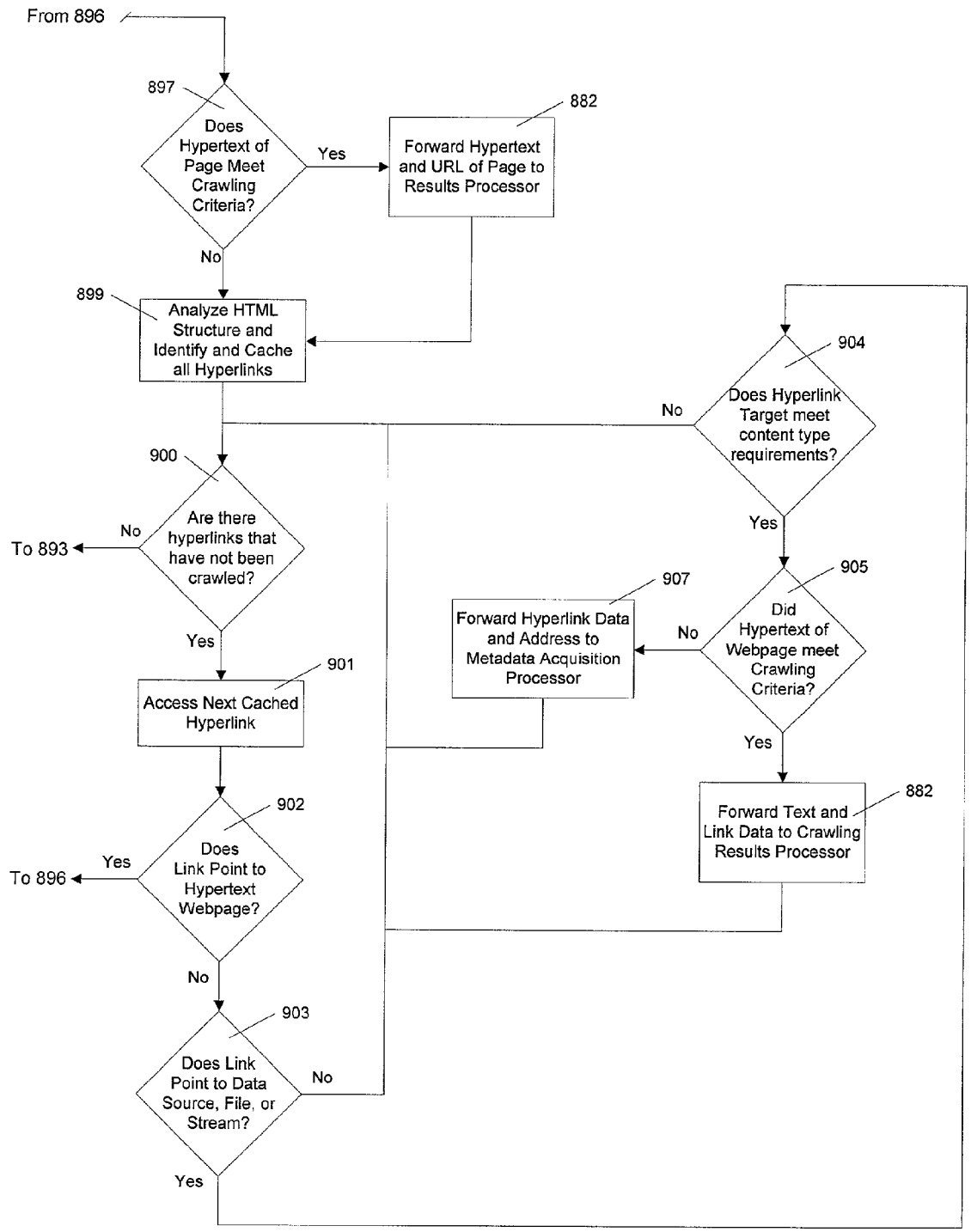

The crawling operation is represented by routine 881 in FIG. 10 and is expanded in FIGS. 11a and 11b to show subroutines. In FIG. 11a, routine 890 first caches, or stores, the three data sets (i.e., the list of network resources, the crawling criteria, and the crawler content provider data) and routine 891 exchanges administrative data with the system administrator 500 and initiates the crawling process. Administrative data exchanged with the system administrator 500 includes information about the crawling data sets that have been received and about the initiation of the crawling process such as a time stamp for the start of the crawl, internal identifier information for the data sets, and other relevant system status data. Due to the large number of network resources such as domain names and URLs to be searched, the network crawler 366 may perform the crawling operation using numerous identical crawling servers 366a. Routine 892 analyzes the entire network resource data set and subdivides the resource data set into smaller lists based on criteria that may include the overall size of the network resources data set, the optional loading of available crawling servers 366a, the number of crawling servers installed, stores administrative data about the smaller lists, and forwards each smaller list to a designated crawling server. The remainder of the processes represented in FIGS. 11a and 11b may be performed in parallel on each crawling server 366a using the crawling server's unique list of network resources.

Each crawling server 366a starts by reading the first network resource record in its list, routine 893. Each network resource list has an end of file identification string after the last resource record and routine 894 tests the condition of whether the end of file identification string has been loaded as the next network resource. Until the end of file identification string is encountered, the condition will be "no," which will continue processing at routine 895. The network crawler 366 then initiates communications with the target network resource using standard network protocols such as the hypertext transfer protocol (HTTP) and requests to download files containing the desired hypertext web page, routine 895. The network crawler 366 then downloads and caches those hypertext files, routine 896.

Moving to FIG. 11b, routine 897 determines if the contents of the hypertext files meet the conditions of the crawling criteria. This is accomplished by parsing the content of the hypertext files and running a comparison algorithm to determine if the hypertext files contain elements listed in the criteria database 362, such as keywords, data type descriptions, and metadata descriptors. If the hypertext file is determined to contain sufficient matching data and the hypertext files are determined to not have been downloaded before or to have been updated since the last download, the hypertext files along with the URL, or network address, of the web page are routed to the content crawler results processor 368 where the hypertext files are cached for further processing. Processing is then routed to routine 899. During the download and analysis of web pages and other resources, the network crawler 366 may ignore certain embedded data types such as image files that do not contain data that can be compared to the crawling criteria. For example, a television station's website that contains a table representing the station's broadcast schedule along with several image files to be displayed in a web browser may result in only the hypertext of the page containing the schedule table to be forwarded to the results processor 368. If the hypertext files of the page do not meet the crawling criteria, nothing is sent to the results processor 368, and processing moves on to routine 899.

In addition to crawling hypertext web pages for the designated search criteria, the network crawler 366 may identify and follow links to other web pages and data source locations containing files and streaming data that meet content requirements for the system 200. This process starts at routine 899, which analyzes the hypertext structure of the current data files and identifies, extracts, and caches all hyperlink data. When initially cached, the hyperlinks are designated as not having been crawled. Routine 900 analyzes the cached hyperlinks to determine if any of the cached hyperlinks remain to be crawled and if so, relays this information to routine 901, which reads the next record in the hyperlink cache. When all cached hyperlinks have been crawled, processing returns to routine 893, which then loads the next resource record contained in the network resource list for that crawling server. If a hyperlink remains to be crawled, the crawling server analyzes (routine 902) the structure of the hyperlink to determine if the hyperlink points to, or lists the address to, another set of hypertext files representing a web page. If another set of hypertext files is indicated, processing returns to routine 896 in order to analyze that hypertext page and add any hyperlinks contained therein to the hyperlink cache. As processing from routine 896 through routine 892 is iterated under a network resource or domain, the network crawler 366 indexes web sites of interest and caches hyperlinks under that particular domain. If in routine 902 the hyperlink does not point to additional hypertext files, the hyperlink likely references a stored data file or a data-streaming source. Routine 903 accesses the resource referenced by the hyperlink and determines if the resource is a data source, file, or data transport stream. If the resource is not a data source for, or data transport stream, processing loops back to routine 900 to test the next hyperlink. Otherwise, the target resource of the hyperlink is accessed and analyzed to determine if the resource is a data source that meets content type requirements within the crawling criteria database 362, routine 904. If the target does not meet content type requirements, then processing loops back to routine 900 to test the next hyperlink. If the target resource does meet content type requirements and the hypertext containing the link satisfies the crawling criteria, then the text of the hyperlink and data concerning the target resource are sent by routine 905 to the crawling results processor 368 and processing loops back to routine 900 to test the next hyperlink. If the target resource meets content type requirements, but the resource's associated hypertext files do not meet the original crawling criteria, the hyperlink data and network resource address are routed (routine 987) to the metadata acquisition processor 367, which may extract metadata from the target source itself. When that process is completed for a given hyperlink, the metadata acquisition processor 367 returns processing to routine 900. When an end-of-file string of the resource record listing has been reached by routine 893, the crawling has been completed and routine 894 passes processing to routine 908 (see FIG. 11a), which logs administrative data concerning the crawling operation with the system administrator 500 and passes processing to the content crawler results processor 368, routine 885. The recursive processing of hypertext and hyperlinks performed by the network crawler 366, routine 881, effectively accesses every web page, data file, remote content server 204 and data stream available under every known domain name and network resource and retrieves all addressing data and content metadata from those sources required by the system 200 to fully describe and access that digital content.

Functionality of the network crawler 366 may conform to all legal restrictions and upto-date industry best-practices for such network robot systems. Examples include adherence to robot exclusion guidelines and careful network load monitoring in order to avoid overloading remote network servers with data requests during the crawling process. The remote content crawler 356 may also be scalable to accommodate the rapidly growing network 205 and to incorporate evolving protocols and communications technologies.

When the content of a set of hypertext files does not meet crawling criteria, however hyperlinks within those files point to data resources that meet content type requirements, the hyperlink data is routed to the metadata acquisition processor 367. The metadata acquisition processor 367 then discovers metadata information about the target data file or transport stream, routine 883, and returns the metadata to the results processor 368, routine 884, for possible inclusion in the remote content database 517. Metadata acquisition may be accomplished in several ways including transferring or downloading all or part of files and analyzing the file structure for known metadata field descriptors and field contents. The metadata acquisition processor 367 may first establish communication with a host server using standard transfer protocols and begin downloading the target resource file or data transport stream. When the transfer starts, the metadata acquisition processor 367 may buffer the data stream and begin a subroutine that analyzes the binary content of the data. Byte patterns of the content data are compared to a table of all known content file and content transport stream types in order to verify the content type. Once the content type is verified, the metadata acquisition processor 367 analyzes the buffered data contents and compares that to the expected metadata patterns and extracts the contents of known metadata fields and caches this information. Once the metadata acquisition processor 367 has extracted all of the metadata that the processor 367 can recognize within the buffered data, the metadata acquisition processor 367 sends the cached metadata along with the hyperlink text and addressing data to the content crawler results processor 368, routine 884.

The content crawler results processor 368 collects the data returned from the crawling process, sorts the data according to crawling criteria and content providers, and formats and packages the data for entry into the aggregator remote content database 517. These functions are performed by routine 885 in FIG. 10. As the results processor 368 receives data concerning a particular piece of content, the results processor 368 may first verify that crawling criteria have been met, associate a rank weighting factor to the data based on which and how many criteria were met, format the data into database records, and cache the database records according to content provider into content provider bundles. Content provider bundles are temporary data sets of database records associated with a particular content provider, or that were available under the same top-level network domain name. The results processor 368 may also eliminate undesirable content listings based on criteria and provider data. Such eliminated content listings include amateur video files, non-commercial software products, and data that cannot be verified as being provided by the legal rights holder or one of its assigns. When crawling results for a provider or network domain have been received, the results processor 368 collects statistical information about the content provider and returns this data to the crawler content provider processor 363, routine 886. The results processor 368 then forwards the contents of the current content provider bundle to the content database server 515 for storage in the remote content database 517, routine 887. The results process continues throughout the duration of the network crawling process and continuously sends updated database records to the content database server 515.

The invention claimed is:

1. An apparatus, comprising:
   a remote content crawler processor that controls the apparatus;
   a network resource processor that acquires data related to resources coupled to one or more communications networks;
   a crawling criteria processor that acquires crawling criteria, said crawling criteria comprising a plurality of conditions, said plurality of conditions comprising content subject matter, content type, and a delivery method, said acquiring of crawling criteria comprising analyzing hypertext associated with desired hyperlinks and analyzing text proximate to the desired hyperlinks;
   a crawler content provider processor that receives, processes and stores content provider listings; and
   a network crawler comprising at least one server, wherein the network crawler crawls content providers to acquire data related to available content in accordance with the crawling criteria,
   wherein said remote content crawler processor determines that the acquired data related to the resources coupled to one or more communications networks meets said plurality of conditions of said crawling criteria.

2. The apparatus of claim 1, further comprising:
   a content crawler results processor;
   a metadata acquisition processor; and one or more databases, the one or more databases storing information and data generated in and received by the remote content crawler.

3. The apparatus of claim 2, wherein the one or more databases, comprise:
a content provider listing database;
a crawling criteria database; and
a network resources database.

4. A method comprising:
acquiring network resource data, wherein the network resource data comprises address data for content servers;
acquiring crawling criteria, wherein the crawling criteria comprises a plurality of conditions and are used during a crawling operation to search for content, said plurality of conditions comprising content subject matter, content type, and a delivery method;
crawling network resources via at least one processor in accordance with the crawling criteria;
determining if a content provider data meets said plurality of conditions of said crawling criteria;
providing said content provider data to a user terminal; and
receiving content provider rankings from users of a network,
wherein acquiring the crawling criteria comprises automatically acquiring the crawling criteria, and
wherein automatically acquiring the crawling criteria, comprises:
analyzing and importing metadata schemes for standardized and proprietary content formats;
parsing metadata field names and descriptive terms;
analyzing hypertext associated with desired hyperlinks; and
analyzing text proximate to the desired hyperlinks, wherein analyzing hypertext identifies terms that relate to a data type or content category.

5. The method of claim 4, further comprising storing the network resource data, the crawling criteria, and the content provider data in one or more databases.

6. The method of claim 4, wherein acquiring network resource data comprises indexing the address data according to one or more address types.

7. The method of claim 6, wherein the address types include top-level domain and subdomain names, Universal Resource Identifiers, Universal Resource Locators (URLs), and Internet Protocol (IP) address numbers.

8. The method of claim 4, further comprising updating the address data.

9. The method of claim 8, wherein updating the address data, comprises:
receiving hyperlinked domain names for the network resources;
downloading domain name records from public and private domain name registration sources;
synchronizing local Domain Name Service (DNS) databases with one or more DNS databases over one or more communications networks;
performing reverse domain name resolution, comprising locating URLs associated with allowable IP address numbers;
verifying DNS aliases and duplicate URLs against IP addresses; and
eliminating any duplicate URLs identified by the verifying step.

10. The method of claim 4, wherein the network resource data comprises:
a URL owner identity;
a URL owner contact information;
available content types;
an expiration time of a domain name; and
subdomain names to be excluded during crawling.

11. The method of claim 4, wherein the crawling criteria, comprises:
terms, phrases and keywords;
data type descriptions;
metadata field names; and
metadata type descriptors, wherein the metadata type descriptors are associated with eligible content as one or more of hypertext descriptions and embedded file and data stream attributes and metadata.

12. The method of claim 4, wherein acquiring the crawling criteria comprises acquiring the crawling criteria through manual input.

13. The method of claim 4, wherein the ranking of the content providers is based on one or more of quantity of available content, provider professional association membership, and content provider ratings.

14. The method of claim 13, further comprising determining a frequency of crawling a content provider based on the ranking of the content provider.

15. The method of claim 4, wherein crawling the network resources comprises crawling with one or more crawling servers.

16. The method of claim 15, further comprising:
subdividing the network resources;
assigning the subdivided network resources to the one or more crawling servers; and
at a crawler server:
reading data from the assigned network resources,
communicating with the assigned network resources,
downloading data from the assigned network resources.

17. The method of claim 16, further comprising:
following links from a first network resource to subsequent network resources, wherein following the links comprises:
analyzing hypertext structure of the first network resource to determine if the links have been crawled,
determining if a network resource has been downloaded or updated since a previous crawl of the network resource, and
analyzing the hypertext structure to determine if the link points to a network resource comprising a web page or other hypertext file.

18. The method of claim 17, further comprising:
caching hypertext files containing the data related to the content;
caching the links from the first network resource to subsequent network resources; and
indexing web pages or other hypertext files of interest.

19. The method of claim 17, wherein comparing the content to the crawling criteria comprises using a comparison algorithm that compares elements in a hypertext file to the crawling criteria.

20. The method of claim 4, further comprising:
acquiring and processing metadata related to a network resource included in the network resources; and
processing content results from the network resource.

21. A method comprising:
acquiring network resource data, wherein the network resource data comprises address data for content servers;
acquiring crawling criteria, wherein the crawling criteria comprises a plurality of conditions and are used during a crawling operation to search for content, said plurality of conditions comprising content subject matter, content type, and a delivery method;

crawling network resources via at least one processor in accordance with the crawling criteria;

determining if a content provider data meets said plurality of conditions of said crawling criteria;

providing said content provider data to a user terminal;

receiving content provider rankings from users of a network; and updating the address data, wherein updating the address data, comprises:

receiving hyperlinked domain names for the network resources;

downloading domain name records from public and private domain name registration sources;

synchronizing local Domain Name Service (DNS) databases with one or more DNS databases over one or more communications networks;

performing reverse domain name resolution, comprising locating URLs associated with allowable IP address numbers;

verifying DNS aliases and duplicate URLs against IP addresses; and eliminating any duplicate URLs identified by the verifying step.

\* \* \* \* \*